US012102040B2

(12) United States Patent
Kim et al.

(10) Patent No.: US 12,102,040 B2
(45) Date of Patent: Oct. 1, 2024

(54) APPARATUS FOR AUTOMATICALLY SEPARATING FINE-SIZED SEEDS

(71) Applicant: SEOUL NATIONAL UNIVERSITY R&DB FOUNDATION, Seoul (KR)

(72) Inventors: Hyoujin Kim, Seoul (KR); Ji Young Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 18/317,359

(22) Filed: May 15, 2023

(65) Prior Publication Data

US 2024/0074355 A1   Mar. 7, 2024

(30) Foreign Application Priority Data

May 13, 2022   (KR) ........................ 10-2022-0059010

(51) Int. Cl.
*A01F 12/44*   (2006.01)
*A01F 7/02*   (2006.01)
*A01F 11/00*   (2006.01)

(52) U.S. Cl.
CPC .............. *A01F 12/446* (2013.01); *A01F 7/02* (2013.01); *A01F 11/00* (2013.01)

(58) Field of Classification Search
CPC ...... A01F 12/44; A01F 12/446; A01F 12/448; A01F 11/00; A01F 7/02
USPC ......................................................... 209/3
See application file for complete search history.

(56) References Cited

U.S. PATENT DOCUMENTS

| 3,524,544 | A | * | 8/1970 | Jager | ........................ B07B 4/04 |
| | | | | | 209/11 |
| 2018/0141087 | A1 | * | 5/2018 | Ivanovich Orsyk | .... B07B 11/02 |

FOREIGN PATENT DOCUMENTS

| CN | 106258234 | A | * | 1/2017 | |
| CN | 106342489 | A | * | 1/2017 | ............. A01F 11/00 |
| CN | 207042840 | U | * | 2/2018 | |
| CN | 106258234 | B | * | 6/2018 | |
| CN | 108966849 | A | * | 12/2018 | |
| CN | 208661433 | U | * | 3/2019 | |
| CN | 209918335 | U | * | 1/2020 | |
| CN | 112237977 | A | * | 1/2021 | ......... B02C 18/0084 |
| JP | 2521475 | B2 | * | 6/1987 | |

(Continued)

OTHER PUBLICATIONS

Office Action dated May 16, 2023 in Korean Application No. 10-2022-0059010.

*Primary Examiner* — Terrell H Matthews
(74) *Attorney, Agent, or Firm* — Saliwanchik, Lloyd & Eisenschenk

(57) ABSTRACT

The present disclosure relates to an apparatus for automatically separating fine-sized seeds including a hopper where a plant object for seed separation is introduced, a crushing separator disposed below the hopper, to crush the plant object being introduced from the hopper and physically separate the seeds from the plant object, a cyclone part that the seeds and non-seed plant objects, which are crushed and separated in the crushing separator, are introduced, and by cyclone flow, the heavy seeds sink whereas the light-weighted non-seed plant objects float inside, thereby separating the seeds from the rest of plant debris, and a strainer part that is mounted to a lower end of the cyclone part and passes the seeds through a strainer filter, thereby spatially separating the seeds from the rest of plant debris.

9 Claims, 8 Drawing Sheets

(56) References Cited

FOREIGN PATENT DOCUMENTS

| | | | |
|---|---|---|---|
| KR | 10-1616525 B1 | 4/2016 | |
| RU | 2249939 C2 * | 4/2005 | ............. A01D 41/04 |
| SU | 1479102 A1 * | 5/1989 | |
| WO | WO-2023219452 A1 * | 11/2023 | ............. A01F 11/00 |

* cited by examiner

APPARATUS FOR AUTOMATICALLY SEPARATING FINE-SIZED SEEDS

CROSS-REFERENCE TO RELATED APPLICATION

This application claims the benefit of Korean Application No. 10-2022-0059010, filed on May 13, 2022, the disclosure of which is incorporated by reference herein in its entirety.

1. FIELD

The present disclosure relates to an apparatus for automatically separating fine-sized seeds, particularly, an apparatus capable of automatically separating the fine-sized seeds from a plant object, such as *Arabidopsis thaliana*, at high speed.

2. BACKGROUND

Model organisms are selected to study and understand the genetic mechanisms of biological phenomena. *Arabidopsis thaliana* is a widely used model organism along with mice, *Drosophila melanogaster*, *Caenorhabditis elegans*, yeast, and *Escherichia coli*. Since the whole genome sequence (about 135 megabases) of *Arabidopsis thaliana* was disclosed at the end of 2000, research on this plant has grown explosively. In particular, many of the genes of *Arabidopsis thaliana* have the same function as the genes of essential food resources such as rice and wheat; therefore, the information gained from the study of genes in *Arabidopsis thaliana* can be applied to improving the function of crops.

*Arabidopsis thaliana*, hereafter *Arabidopsis*, is an annual plant species belonging to the Brassicaceae family. *Arabidopsis* grows for about six weeks after germination until seeds are set. Even when growth is complete, plants stay relatively short with heights ranging between 25 and 30 cm.

It is known that the seed weight of *Arabidopsis* is about 0.03 mg and the seed diameter is 500 µm. Since more than 1000 seeds can be obtained per individual, *Arabidopsis* is ideal for performing genetic analysis. In order to collect a large number of *Arabidopsis* seeds with very small sizes, researchers in laboratories around the world have been using scissors, a strainer, and paper. After drying the fully-grown *Arabidopsis* plants, they are rubbed first by hand to separate the silique covering the seeds from the stem. Then, the seeds are further separated from the siliques and other plant debris by filtering them through a strainer.

The aforementioned method has been widely used since the 1990s, when *Arabidopsis* research accelerated. In the case of general crop harvesting, seeds are collected from many individuals at once using a thresher. The seeds of *Arabidopsis* are usually collected from genetically modified plants or mutants for follow-up genetic analyses; therefore they must be collected from individuals without mixing each other's. As a result, a seed collection process has been carried out manually and took a long time. If it takes too long to harvest the seeds, the germination rate of the seeds will also decrease. Furthermore, while seeds are collected manually, about 20-30% of seed loss occurs (loss due to wind, loss due to seeds bouncing out due to the size of the sieve, etc.), causing significant inconvenience.

PRIOR ART LITERATURE

Patent Literature

KOREAN PATENT REGISTRATION NO. 10-1616525

SUMMARY

Therefore, the purpose of the present disclosure is to resolve such problems of the prior art by inventing an apparatus for automatically separating fine-sized seeds, which is capable of physically separating the seeds from a plant object by making a plant in a hopper undergo a crushing separator to release the seeds as going through a cyclone part. The cyclone flow and a strainer mounted to the lower end of the cyclone part allow for a two-step collection of the fine-sized seeds rapidly and conveniently.

The problems to be solved by the present disclosure are applied not only to the above-mentioned problems but also to other problems not mentioned here, which will be clearly understood by those skilled in the art from the following description.

The aforementioned purpose may be achieved by an apparatus for automatically separating fine-sized seeds, which includes a hopper where a plant object for seed separation is introduced; a crushing separator disposed below the hopper, to crush the plant object being introduced from the hopper and physically separate the seeds from the plant object; a cyclone part that the seeds and non-seed plant objects, which are crushed and separated in the crushing separator, are introduced, and by cyclone flow, the heavy seeds sink whereas the light-weighted non-seed plant objects float inside, thereby separating the seeds from the rest of plant debris; and a strainer filter part that is mounted to a lower end of the cyclone part and passes the seeds through a strainer filter, thereby spatially separating the seeds from the rest of plant debris.

Here, the crushing separator may include a motor; and a pair of gears that rotate inwardly to crush the plant object engaging each other by receiving the power from the motor. This motion enables the plant object in the hopper to be introduced into an upper part of the gear, crushed, and then discharged to a lower part of the gear.

Here, the cyclone part may include a main body part including an inlet where the seeds and non-seed plant objects that are crushed and separated, in the crushing separator, are introduced and a flow space part that forms a space for generating cyclone flow; and a suction motor that is disposed of above the flow space part to suck air inside the flow space part.

Here, the cyclone part may further include a suction guide part that extends from the suction motor and is inserted inside the flow space part.

Here, the inlet may be formed such that the seeds and non-seed plant objects, that were crushed and separated, in the crushing separator, are introduced in a tangential direction of the flow space part.

Here, the detachable strainer filter part may be mounted to the lower end of the cyclone part, such that a pore size of the strainer filter is adjustable.

Here, a chamber, which is detachably mounted to a lower end of the strainer filter part to store the separated seeds, may be further included.

Here, between the cyclone part and the strainer filter part, and between the strainer filter part and the chamber, magnetism is used to detach and attach to each other. The strength of the magnetism may be different, respectively.

Here, the strength of the magnetism between the cyclone part and the strainer filter part may be greater than the strength of the magnetism between the strainer filter part and the chamber.

Here, the plant object may be *Arabidopsis thaliana*.

According to the apparatus for automatically separating fine-sized seeds of the present disclosure described above, there is an advantage that the fine-sized seeds of a plant object such as *Arabidopsis* can be quickly and easily separated and collected.

Further, there is also an advantage of a high seed collection rate.

DETAILED DESCRIPTION

Figure 1:
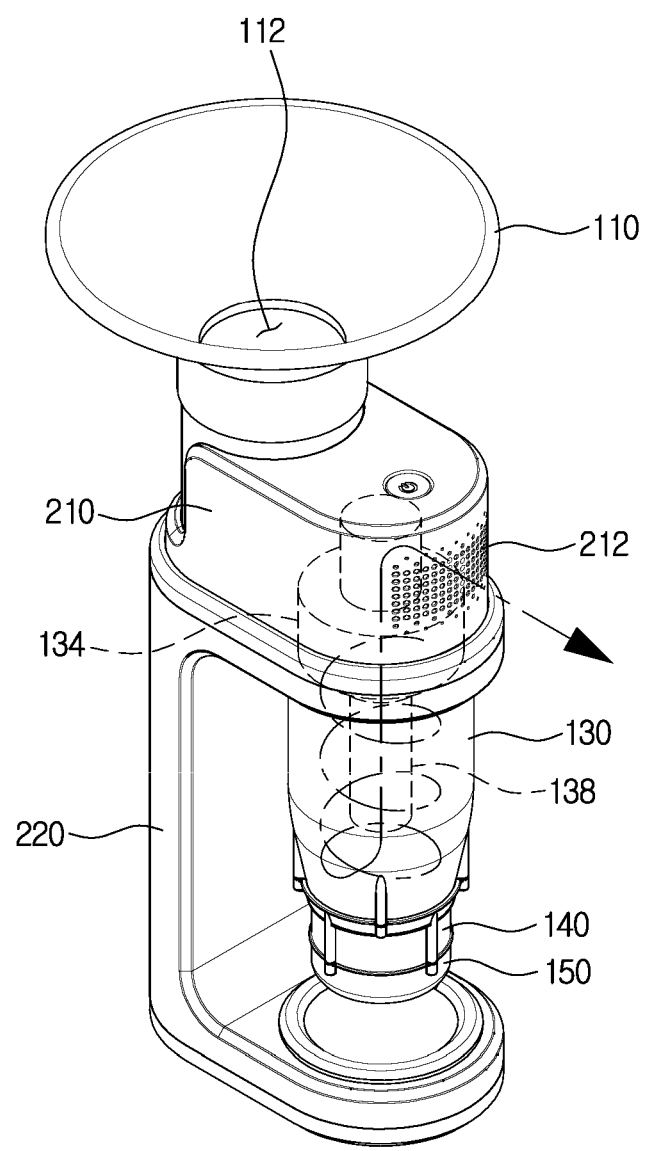
FIG. 1 is a perspective view of an apparatus for automatically separating fine-sized seeds according to an embodiment of the present disclosure.

Specific matters of the embodiments are included in the detailed descript and drawings.

The advantages and features of the present disclosure, and methods of achieving them, will become clear with reference to the embodiments described below in detail in conjunction with the accompanying drawings. However, the present disclosure is not limited to the embodiments disclosed below. It may be implemented in various forms, and the present embodiments are merely provided to make the present disclosure complete and comprehensively inform the scope of the present disclosure to those with ordinary knowledge of the art to which the present disclosure belongs. The present disclosure is only defined by the scope of the claims. Like reference numerals indicate like elements throughout the specification.

Hereinbelow, the present disclosure will be described with reference to the drawings for explaining the apparatus for automatically separating fine-sized seeds according to the embodiments of the present disclosure.

Figure 2:
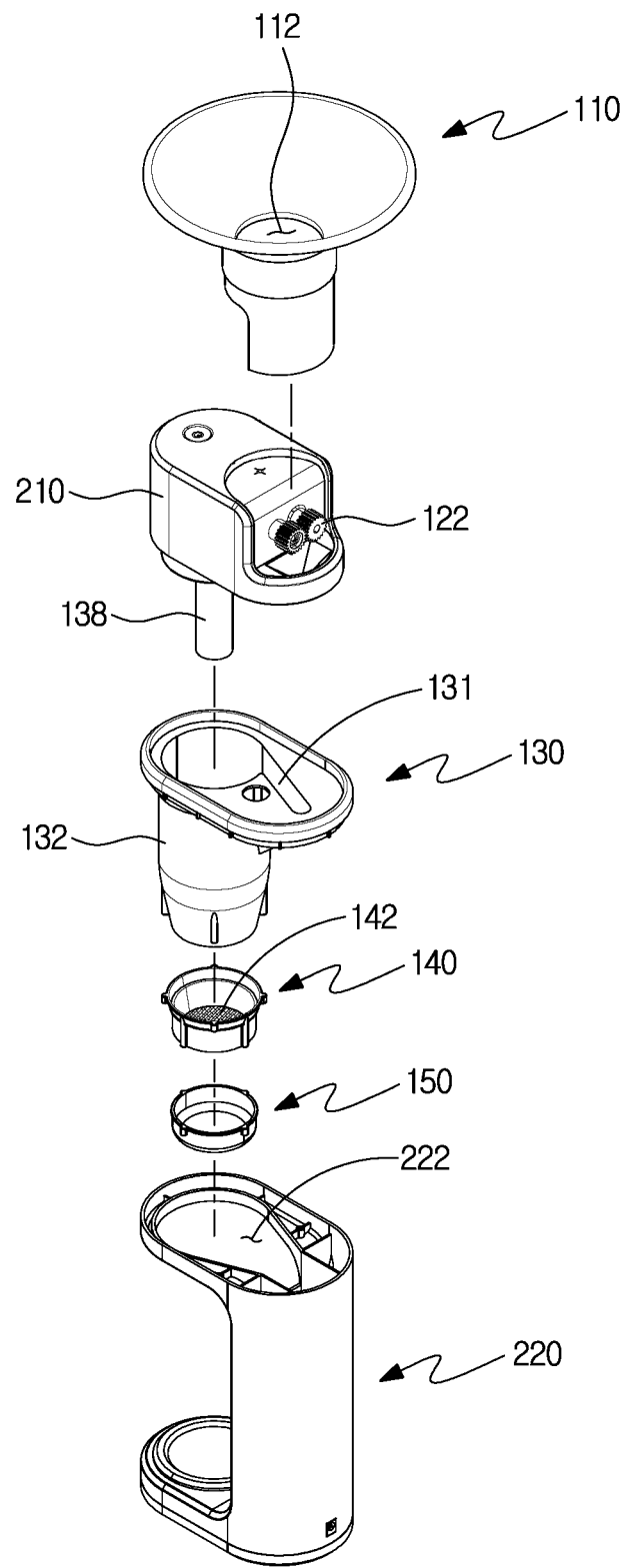
FIG. 2 is an exploded perspective view of FIG. 1.
Figure 3:
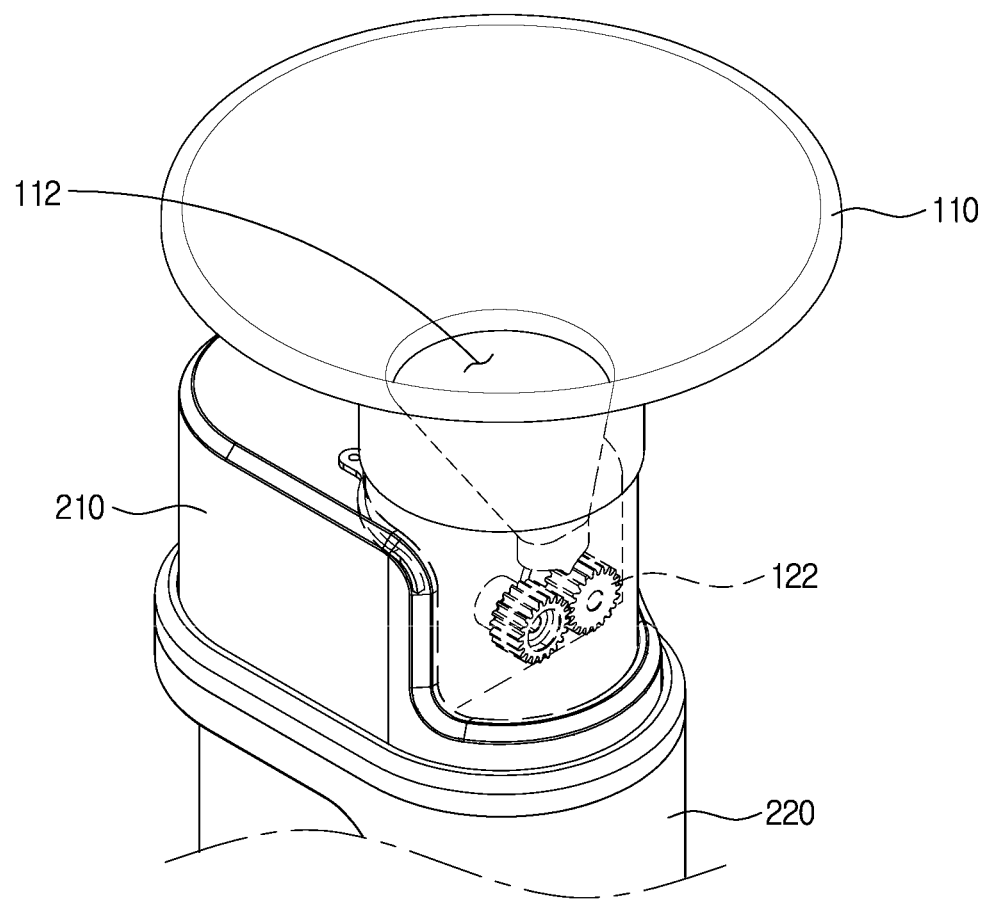
FIG. 3 and FIG. 4 are a perspective view and a detailed view of a hopper and a crushing separator of FIG. 1, respectively.
Figure 4:
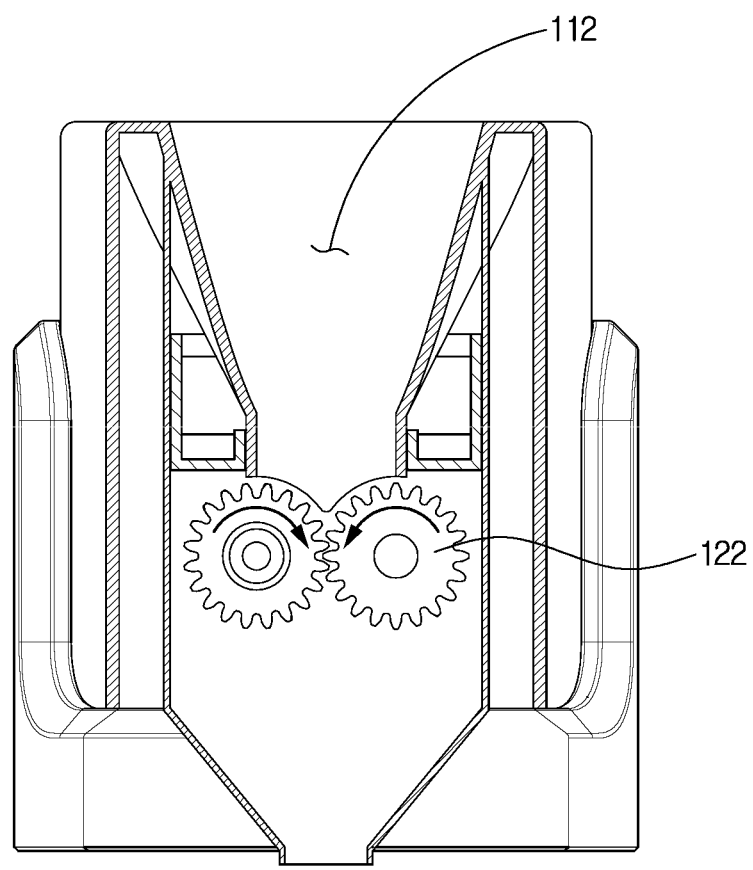
Figure 5:
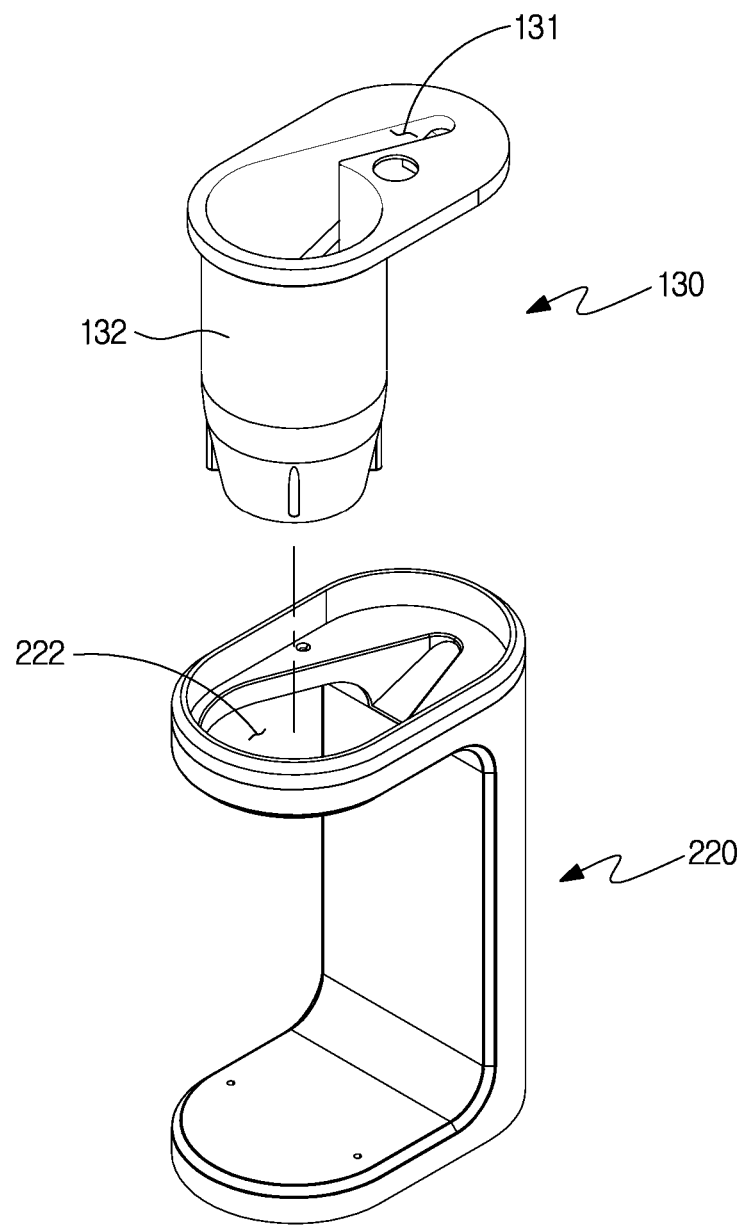
FIG. 5 is a perspective view illustrating a main body part that is separated from a lower housing.
Figure 6:
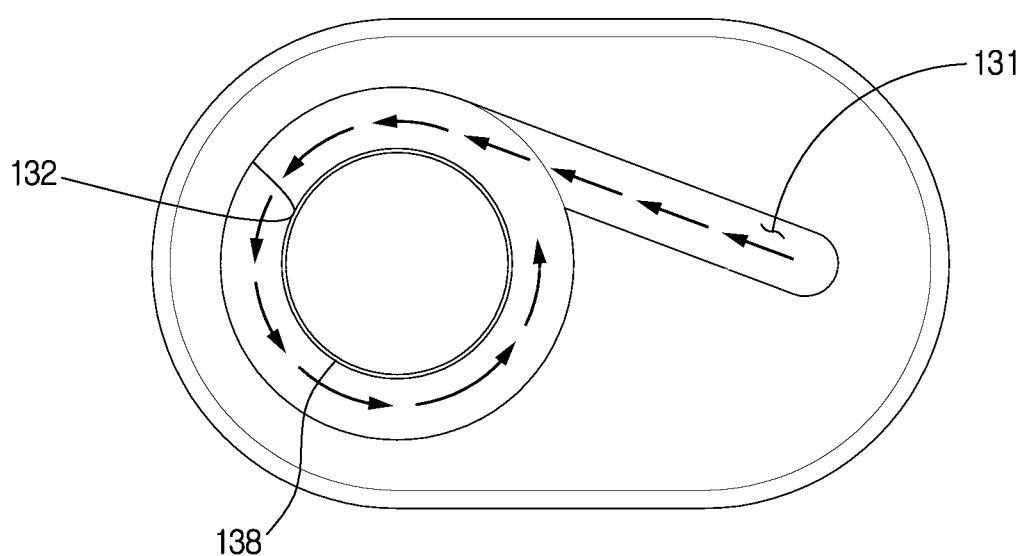
FIG. 6 is a view illustrating a cyclone flow inside the main body part.
Figure 7:
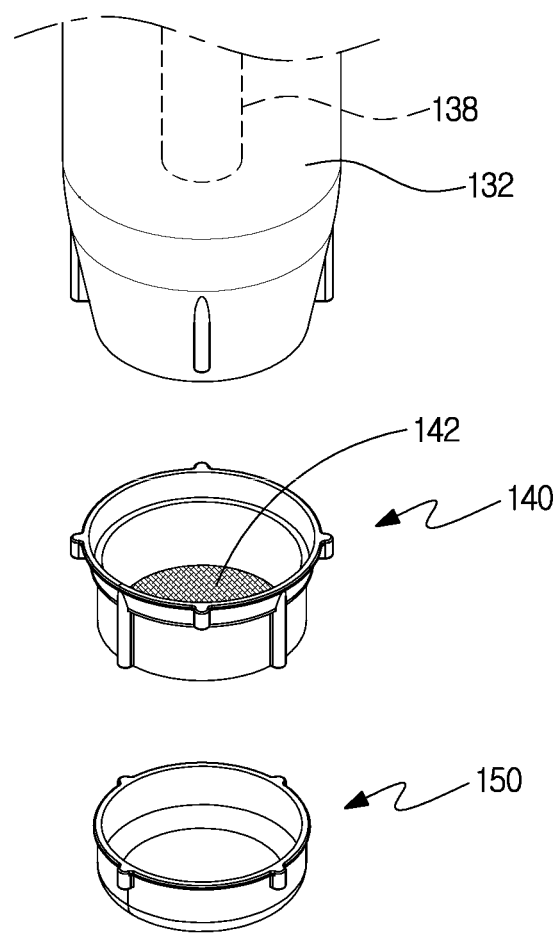
FIG. 7 is an exploded perspective view of a strainer filter part and a chamber of a lower end of a cyclone part.
Figure 8:
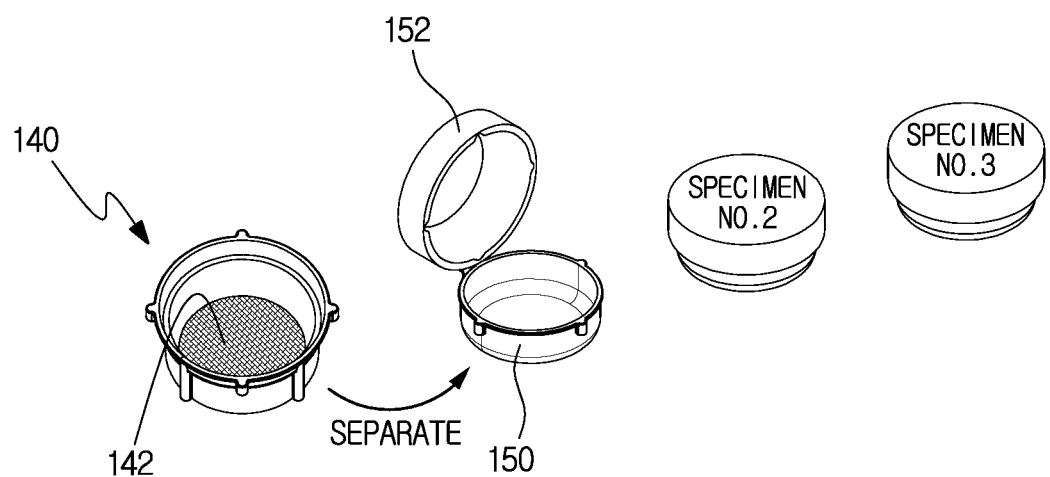
FIG. 8 illustrates collecting seeds in a plurality of chambers.

FIG. 1 is a perspective view of an apparatus for automatically separating fine-sized seeds according to an embodiment of the present disclosure; FIG. 2 is an exploded perspective view of FIG. 1; FIG. 3 and FIG. 4 are a perspective view and a detailed view of a hopper and a crushing separator of FIG. 1, respectively; FIG. 5 is a perspective view illustrating a main body part that is separated from a lower housing; FIG. 6 is a view illustrating a cyclone flow inside the main body part; FIG. 7 is an exploded perspective view of a strainer filter part and a chamber of a bottom part of a cyclone part; FIG. 8 illustrates collecting seeds in a plurality of chambers.

The apparatus for automatically separating fine-sized seeds according to an embodiment of the present disclosure may be configured to include a hopper 110, a crushing separator, a cyclone part, and a strainer filter part 140. In addition, a chamber 150 may be further included.

The hopper 110 is formed with a slot 112 into which a plant object for seed separation is introduced. As illustrated, the slot 112 may be formed such that the diameter at the entrance of the slot 112 is wide and the diameter decreases as it gets closer to the bottom. Especially, as illustrated in FIG. 3, the slot 112 may be formed such that the diameter symmetrically decreases up until the middle part, and then from below the middle part, the diameter of the slot 112 gradually decreases, biasedly towards the upper part of the gear that forms the crushing separator.

The hopper 110 may be formed of a transparent material so that the process of crushing the introduced plant object by the crushing separator to be described later can be observed.

The hopper 110 may be detachably mounted on top of one side of an upper housing 210. Therefore, the hopper 110 may be detached and easily cleaned.

In the present, an example of the plant object being introduced may be *Arabidopsis* which has finished growing. The apparatus for automatically separating fine-sized seeds according to the present disclosure may be used to separate fine-sized seeds having a size of tens to hundreds of microns, such as seeds of *Arabidopsis*, but the size of the fine-sized seeds that can be separated is not necessarily limited thereto. By adjusting the size of a strainer filter 142, other fine-sized seeds may also be separated. Therefore, in the present disclosure, as will be described later, the strainer filter 142 is configured to be easily attached or detached.

The crushing separator is disposed of below the hopper 110 to physically separate the seeds from the plant object by crushing the plant object introduced through the outlet of the slot 112 of the hopper 110. For example, the plant object being put in the apparatus of the present disclosure may be a dried *Arabidopsis*, which may be physically separated into seeds, and non-seed plant objects that include the silique surrounding the seeds and stem remains, by the crushing separator.

The crushing separator may be configured to include a motor (not illustrated) and one pair of gears 122.

A motor for rotating the gear 122 is disposed inside the upper housing 210, and the one pair of gears 122 that may be rotated by the power received from the motor may be formed to protrude towards the outside of the upper housing 210. Here, the one pair of gears 122 are horizontally disposed of left and right, meshed with each other, and rotate inwardly, so that the plant object put between the two gears 122 can be introduced inside between the two gears 122 rotating inwardly, and physically crushed.

Therefore, the outlet of the slot 112 of the hopper 110 may be disposed of above and between the one pair of gears 122. The plant object introduced from the slot 112 of the hopper 110 is introduced between the one pair of gears 122 and physically crushed, and the seeds and non-seed plant objects, crushed and thus separated, are discharged to a lower part of the gear 122 and introduced inside the main body part 130 of the cyclone part.

In the cyclone part, the seeds and the non-seed plant objects, crushed and separated in the crushing separator, may be introduced, and due to a cyclone flow, the seeds which are relatively heavy will sink, while the non-seed plant objects which are relatively light will either flow in the space by centrifugal force or can be moved to another space, thus spatially separating the seeds and the non-seed plant objects.

The cyclone part may be configured to include a main body part 130 and a suction motor 134. In addition, a suction guide part 138 may be further included.

The main body part 130 may be formed with an inlet 131 through which the seeds and the non-seed plant objects, physically separated by crushing by the crushing separator, may be introduced, and a flow space part 132 formed with an inner space for spatially separating the seeds and the non-seed plant objects by the cyclone flow.

The flow space part 132 has a substantially cylindrical shape and forms a space in which air flows therein. The top and bottom of the flow space part 132 may be open, but the top of the flow space part 132 may be covered by the upper housing 210 fastened to the upper part of the main body part 130, and a strainer filter part 140 may be fastened to the bottom of the flow space part 132. Thus, the flow space part 132 may form an inner space where the top and bottom are closed.

At the top of the main body part 130, the inlet 131 described above, may be formed. As illustrated, the top of the main body part 130 may be formed to protrude to one side of the flow space part 132 and may be disposed between the upper housing 210 and the lower housing 220, and here, the inlet 131 may be formed on that part that protrudes to one side. The inlet 131 may be disposed of below the gear 122 described above, to introduce the seeds and the non-seed plant objects, crushed in the gear 122, to the inlet 131.

Here, the inlet 131 may be formed on one side of the flow space part 132 so that the seeds and the non-seed plant objects introduced by crushing from the gear 122 are introduced in a tangential direction of the flow space part 132. Further, the bottom surface of the inlet 131 may be formed in a downward slope so that the seeds and the non-seed plant objects can be smoothly introduced.

When the seeds and the non-seed plant objects, physically separated in the crushing separator, are introduced into the flow space part 132 through the inlet 131 by the suction force of the suction motor 134, as illustrated in FIG. 6, they are introduced in the tangential direction of the flow space part 132 and rotate along a circumferential direction of the flow space part 132 via the centrifugal force caused by the cyclone flow. Here, the seeds which are relatively heavy fall down the flow space part 132 by the cyclone flow, and the non-seed plant objects including the silique and stem debris which are relatively light, rotate inside the flow space part 132, or may be separated into an external space.

Here, the main body part 130 may be made of a transparent material so that the seed separation process can be observed.

As illustrated, the main body part 130 may be detachably mounted to the lower housing 220, and the upper housing 210 may be mounted on top of the main body part 130.

The lower housing 220 is formed in a '⊏' shape, and a through hole 222 is formed at the upper end so that the flow space part 132 is inserted from the top to the bottom, and at the upper end of the lower housing 220, the upper end of the main body part 130 having the inlet 131, may be seated. Since the main body part 130 is detachable from the lower housing 220, the main body part 130 can be easily cleaned.

The suction motor 134 is disposed above the flow space part 132 to suck air inside the flow space part 132 to generate the cyclone flow inside the flow space part 132. The suction motor 134 may be disposed inside the upper housing 210.

A suction guide part 138 may be formed, that extends from the suction motor 134 and is inserted inside the flow space part 132. Therefore, by the suction force of the suction motor 134, the seeds and the non-seed plant objects, separated in the crushing separator, may be introduced inside the flow space part 132 through the inlet 131 in the tangential direction. The flow of air introduced in the tangential direction moves downwards as it rotates along the space between the outer surface of the suction guide part 138 and the inner surface of the flow space part 132, and then flows inside the suction guide part 138, and then rises, and then discharged through the air outlet 212 formed in the upper housing 210.

The strainer filter part 140 may be mounted onto the lower end of the cyclone part to form the bottom surface of the cyclone part. The bottom surface may be formed as a strainer filter 142. The strainer filter 142 may be a micro-sized strainer filter 142. Therefore, the seeds that sank due to the cyclone flow inside the flow space part 132 may be spatially separated by passing through the strainer filter 142. Therefore, the seeds may be separated and obtained cleanly without residue.

The strainer filter part 140 may be detachably mounted onto the main body part 130 of the cyclone part. Here, the strainer filter part 140 may be detachably mounted using magnetism. Therefore, the strainer filter part 140 may be easily cleaned by making it detachable. Further, depending on the type of the plant object, the size of the seed may also vary, so by replacing the strainer filter part 140 with a different pore size of the strainer filter 142, seed separation may be performed not only for *Arabidopsis* but also for other plant objects such as tobacco, rice, and wheat, etc.

As illustrated in FIG. 8, to the lower end of the strainer filter part 140, a chamber 150 for storing the seeds that passed through the strainer filter 142, may be detachably mounted. It is possible to separate the seeds inside the chamber 150, separate the chamber 150 from the strainer filter part 140, cover it with a lid 152, and then store the seeds inside. Subsequently, another chamber 150 may be mounted to the strainer filter part 140 to collect seeds for another plant object.

The strainer filter part 140 and the chamber 150 may be separated or mounted from/to each other using magnetism. Here, the magnetic strength between the cyclone part and the strainer filter part 140 and the magnetic strength between the strainer filter part 140 and the chamber 150 may be formed differently from each other. For example, the magnetic strength between the cyclone part and the strainer filter part 140 may be relatively strong, and the magnetic strength between the strainer filter part 140 and the chamber 150 may be relatively weakened so that the chamber 150 can be easily separated from the strainer filter part 140 with the strainer filter part 140 coupled to the cyclone part.

Hereinbelow, operations of the apparatus for automatically separating fine-sized seeds according to the present disclosure will be explained.

When a dried plant object is introduced through the slot 112 of the hopper 110 and power is supplied to the apparatus, the motor of the crushing separator and the suction motor 134 of the cyclone part will operate.

The plant object put in the hopper 110 is introduced above the one pair of gears 122 through the outlet of the slot 112, and by the one pair of gears 122, which are horizontally disposed and meshed with each other and rotate inwardly, the plant object is physically separated into seeds and non-seed plant objects including silique and stem debris.

Here, the seeds and the non-seed plant objects, physically separated in the crushing separator, are introduced in the tangential direction of the flow space part 132 through the inlet 131 of the main body part 130 by the suction force of the suction motor 134, and by the flow rotating along the space between the inner surface of the flow space part 132 and the outer surface of the suction guide part 138, the relatively light non-seed plant objects will flow inside the flow space part 132, while the relatively heavy seeds will move down the flow space part 132, thereby being primarily separated spatially.

The seeds that moved below the flow space part 132 will pass through the strainer filter 142 of the strainer filter part 140 forming the bottom surface of the cyclone part, thereby being secondarily separated spatially more cleanly.

Therefore, the chamber 150 which may be detachably mounted below the strainer filter part 140, can store cleanly separated seeds.

The hopper 110, the main body part 130, the strainer filter part 140, and the chamber 150 may each be detachably mounted, and thus easily cleanable. Further, when performing a separation operation for another type of plant object, it is possible to clean the hopper 110, the main body part 130, and the strainer filter part 140, and then mount them again, or replace them and perform the operation.

In addition, according to the present disclosure, it is possible to adjust the suction force of the suction motor 134 and the pore size of the strainer filter 142 of the strainer filter part 140, to separate not only the fine-sized seeds of *Arabidopsis* but also the fine-sized seeds of other plants.

The scope of right of the present disclosure is not limited to the above-described embodiments, but may be implemented in various forms of embodiments within the scope of the appended claims. To various extents that can be modified by anyone skilled in the art without departing from the subject matter of the present disclosure claimed in the claims is considered to be within the scope of the claims of the present disclosure.

REFERENCE NUMERALS

- 110: HOPPER
- 112: SLOT
- 122: GEAR
- 130: MAIN BODY PART
- 131: INLET
- 132: FLOW SPACE PART
- 134: SUCTION MOTOR
- 138: SUCTION GUIDE PART
- 140: STRAINER FILTER PART
- 142: STRAINER FILTER
- 150: CHAMBER
- 152: LID
- 210: UPPER HOUSING
- 212: AIR OUTLET
- 220: LOWER HOUSING
- 222: THROUGH HOLE

What is claimed is:

1. An apparatus for automatically separating fine-sized seeds comprising:
   a hopper where a plant object for seed separation is introduced;
   a crushing separator disposed below the hopper, configured to crush the plant object being introduced from the hopper and physically separate the seeds from the plant object;
   a cyclone part configured to receive the seeds and non-seed plant objects, which are crushed and separated in the crushing separator, such that by cyclone flow, the seeds sink and lighter-weighted non-seed plant objects float therein, thereby initiating separation of the seeds from the non-seed plant objects; and
   a strainer filter part that is mounted to a lower end of the cyclone part and configured to pass the seeds through a strainer filter, thereby spatially separating the seeds from the non-seed plant objects,
   wherein the strainer filter part is detachably mounted to the lower end of the cyclone part, such that a pore size of the strainer filter is adjustable.

2. The apparatus for automatically separating fine-sized seeds according to claim 1,
   wherein the crushing separator comprises:
   a motor; and
   a pair of gears that rotate inwardly to crush the plant object engaging each other by receiving power from the motor,
   wherein the plant object is introduced from the hopper to an upper part of the gears and crushed and then discharged to a lower part of the gears.

3. The apparatus for automatically separating fine-sized seeds according to claim 1,
   wherein the cyclone part comprises a main body part comprising an inlet configured to receive the seeds and non-seed plant objects from the crushing separator, and a flow space part that forms a space for generating cyclone flow; and
   a suction motor that is disposed above the flow space part and is configured to suck air inside the flow space part.

4. The apparatus for automatically separating fine-sized seeds according to claim 3,
   wherein the cyclone part further comprises a suction guide part that extends from the suction motor and is inserted inside the flow space part.

5. The apparatus for automatically separating fine-sized seeds according to claim 3,
   wherein the inlet is formed such that the seeds and non-seed plant objects received from the crushing separator are introduced in a tangential direction of the flow space part.

6. The apparatus for automatically separating fine-sized seeds according to claim 1,
   further comprising a chamber, which is detachably mounted to a lower end of the strainer filter part and configured to store the separated seeds.

7. The apparatus for automatically separating fine-sized seeds according to claim 6,
   wherein between the cyclone part and the strainer filter part, and between the strainer filter part and the chamber, magnetism is used to detach and attach to each other, and the strength of the magnetism is different, respectively.

8. The apparatus for automatically separating fine-sized seeds according to claim 7,
   wherein the strength of the magnetism between the cyclone part and the strainer filter part is greater than the strength of the magnetism between the strainer filter part and the chamber.

9. The apparatus for automatically separating fine-sized seeds according to claim 1,
   wherein the plant object is *Arabidopsis thaliana*.

* * * * *